US010262080B2

(12) United States Patent
Topatan et al.

(10) Patent No.: US 10,262,080 B2
(45) Date of Patent: Apr. 16, 2019

(54) ENHANCED SEARCH SUGGESTION FOR PERSONAL INFORMATION SERVICES

(71) Applicant: Microsoft Technology Licensing, LLC, Redmond, WA (US)

(72) Inventors: Kutlay Topatan, Seattle, WA (US); Irum Iqbal Godil, Bellevue, WA (US); Andrew G. Stoller, Seattle, WA (US); Selvaraj Nalliah, Redmond, WA (US); Joseph P. McLaughlin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/334,837

(22) Filed: Oct. 26, 2016

(65) Prior Publication Data

US 2017/0046450 A1    Feb. 16, 2017

Related U.S. Application Data

(63) Continuation of application No. 13/895,693, filed on May 16, 2013, now Pat. No. 9,514,470.

(51) Int. Cl.
*G06F 17/30* (2006.01)
*G06Q 30/02* (2012.01)

(52) U.S. Cl.
CPC .... *G06F 17/30973* (2013.01); *G06F 17/3064* (2013.01); *G06F 17/3097* (2013.01); *G06F 17/30985* (2013.01); *G06F 17/30991* (2013.01); *G06Q 30/02* (2013.01)

(58) Field of Classification Search
CPC .......................... G06F 17/3064; G06F 17/3097
See application file for complete search history.

(56) References Cited

U.S. PATENT DOCUMENTS

| 7,664,740 B2 | 2/2010 | Starbuck et al. |
| 8,037,044 B2 | 10/2011 | Heidloff et al. |
| 8,892,989 B1 * | 11/2014 | Lieb .................. G06F 17/30994 715/205 |

(Continued)

OTHER PUBLICATIONS

"About "People You May Know" Suggestions", Retrieved from <<https://web.archive.org/web/20130307212246/support.twitter.com/articles/20170137-about-people-you-may-know-suggestions>>, Retrieved on: Mar. 16, 2013, 2 Pages.

(Continued)

*Primary Examiner* — William Spieler (57) ABSTRACT

Systems, methods, and software are disclosed herein for implementing enhanced search suggestion technology. In at least one implementation, a personal information application includes a search suggestion element in which both search suggestions and contacts suggestions may be presented. The personal information application includes a search element in a user interface to a personal information service in which a search query may be entered. Search suggestions and contact suggestions can be identified based at least in part on the search query and presented via a suggestion element in the user interface. An indication of interest made with respect to a contact suggestion results in the presentation of contact details for an associated contact. The presentation of at least the search suggestions persists while the contact details of the associated contact are presented.

20 Claims, 5 Drawing Sheets

(56) References Cited

U.S. PATENT DOCUMENTS

| | | | | |
|---|---|---|---|---|
| 2006/0179114 | A1* | 8/2006 | Deeds | G06Q 10/107 709/206 |
| 2007/0244988 | A1 | 10/2007 | Tsai | |
| 2008/0085742 | A1 | 4/2008 | Karukka et al. | |
| 2012/0109996 | A1 | 5/2012 | Asterbadi | |
| 2012/0185498 | A1* | 7/2012 | Loofbourrow | G06F 17/30395 707/767 |
| 2013/0198297 | A1* | 8/2013 | Saabas | G06Q 10/1095 709/206 |
| 2013/0275453 | A1 | 10/2013 | Vyas et al. | |
| 2015/0006564 | A1 | 1/2015 | Tomkins et al. | |

OTHER PUBLICATIONS

"Better Searching in Outlook 2010", Retrieved from <<http://blogs.office.com/b/microsoft-outlook/archive/2012/03/01/better-searching-in-outlook-2010.aspx>>, Mar. 1, 2012, 3 Pages.

"How to Conduct a Hotmail People Search", Retrieved from <<http://web.archive.org/web/20101221184603/http://publicrecordsguide.com/hotmail-people-search.html>>, Retrieved on: Mar. 7, 2013, 2 Pages.

"Mail (Mountain Lion): Search Messages", Retrieved from <<https://support.apple.com/kb/PH11734?locale=en_GB>>, Sep. 26, 2012, 1 Page.

"Search for People in the Address Book", Retrieved from <<https://web.archive.org/web/20140209203425/http://office.microsoft.com/en-in/outlook-help/search-for-people-in-the-address-book-HA010164235.aspx>>, Retrieved on: Mar. 7, 2013, 2 Pages.

"Using Query Suggestions", Retrieved from <<http://web.archive.org/web/20130218060157/http://onlinehelp.coveo.com:80/en/CES/6.5/User/Using_Query_Suggestions.htm>>, Mar. 7, 2013, 2 Pages.

"Corrected Notice of Allowability Issued in U.S. Appl. No. 13/895,693", dated Aug. 18, 2016, 4 Pages.

"Final Office Action Issued in U.S. Appl. No. 13/895,693", dated Oct. 7, 2015, 13 Pages.

"Non Final Office Action Issued in U.S. Appl. No. 13/895,693", dated Apr. 21, 2016, 20 Pages.

"Non Final Office Action Issued in U.S. Appl. No. 13/895,693", dated Mar. 4, 2015, 13 Pages.

"Notice of Allowance Issued in U.S. Appl. No. 13/895,693", dated Aug. 3, 2016, 7 Pages.

* cited by examiner

FIGURE 4

# ENHANCED SEARCH SUGGESTION FOR PERSONAL INFORMATION SERVICES

CROSS-REFERENCE TO RELATED APPLICATION(S)

This application is a Continuation of, and claims priority to U.S. patent application Ser. No. 13/895,693, filed May 16, 2013, entitled "ENHANCED SEARCH SUGGESTION FOR PERSONAL INFORMATION SERVICES," which application is incorporated herein by reference in its entirety.

TECHNICAL FIELD

Aspects of the disclosure are related to computing hardware and software technology, and in particular to search suggestion in personal information applications.

TECHNICAL BACKGROUND

Personal information services provide users with effective and convenient ways to communicate with others and to manage their personal information. Users typically engage with personal information services through user interfaces provided by associated personal information applications, such as email applications, calendar applications, and task management applications, as well as combinations and variations thereof. Some representative personal information applications and services include Microsoft® Outlook®, Outlook® Web App (OWA), Hotmail®, Gmail®, and Yahoo® Mail, as well as others.

When engaged with a personal information service, a user may interact with various personal information items via a user interface to the service. Examples of such items include emails, contacts, calendar items, tasks, and the like. In a typical scenario, a user's personal information items are stored in a personal information database, such as a mailbox, that is accessed as the user interacts with the application.

Most personal information applications provide users with a search capability for searching their personal information items, including as a search element in the user interface through which search queries may be entered, as well as various search tools. One example is the automatic suggestion feature that automatically provides query suggestions within a suggestion element as search strings are entered. Such suggestions can include the completion of a partially entered term or even a complex search string that are identified by matching past queries or other information to what is being entered.

In some personal information applications, a variety of data types and data stores can be searched from a single search element, such as document repositories, calendars, contacts, and tasks to be searched through a primary search box that primarily provides a search interface to email. Accordingly, in some cases the auto-suggest feature may also include the ability to suggest documents, scheduled events, contacts, tasks, and other items that match a complete or partial search string as it is entered. Selecting any of the suggested items completes the query and launches a search for the selected item.

Overview

Provided herein are systems, methods, and software for implementing enhanced search suggestion technology. In at least one implementation, a personal information application includes a search suggestion element in which both search suggestions and contacts suggestions may be presented. The personal information application includes a search element in a user interface to a personal information service in which a search query may be entered. Search suggestions and contact suggestions can be identified based at least in part on the search query and presented via a suggestion element in the user interface. An indication of interest made with respect to a contact suggestion results in the presentation of contact details for an associated contact. The presentation of at least the search suggestions persists while the contact details of the associated contact are presented.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations disclosed herein enable enhanced search suggestion technology whereby search suggestions and contact suggestions are presented together in a suggestion element. In response to an indication of interest occurring with respect to one of the contact suggestions, the contact details for an associated contact are presented while the search suggestions are persisted in the suggestion element. In this manner, a user may view a contact associated with a contact suggestion without the search suggestions or other items presented in the suggestion being removed from view.

This enables the user to, for example, select a particular search suggestion even after having selected a contact suggestion.

In a brief example, a personal information application includes a user interface to a personal information service. Examples of personal information services include, but are not limited to, email services, scheduling services, and other services that allow users to exchange and organize various types of information. The user interface includes various graphical elements or controls with which a user may interact via interface systems and devices in order to interface with or otherwise access the personal information service. A search element is included, such as a search box in which a search query may be entered, as well as a suggestion element in which both search suggestions and contacts suggestions may be presented. Examples of suggestion elements include a suggestion box, drop-down box, a pop-up box, and a list box, as well as any other suitable user interface element or control that may be rendered in association with a search element.

The search suggestions and contact suggestions can be identified based at least in part on the search query and presented via the suggestion element in the user interface. Identifying the contact suggestions can be accomplished in a variety of ways, such as by searching contacts for at least one contact that satisfies contact criteria. The contact criteria may include, for example, the search query or some of its characters. In at least one scenario, at least some search results associated with the search query are examined, including at least one personal information item included in the search results, for an identity of at least one person. Various contacts are then searched for at least one contact that satisfies contact criteria. The contact may include, for example, the identity of the one person. In such a scenario the contact suggestions may be associated with at least the one contact.

An indication of interest made with respect to a contact suggestion results in the presentation of contact details for an associated contact. For example, a user may touch, click on, audibly reference, point to, or otherwise indicate their interest in or selection of the contact selection. The presentation of the search suggestions persists while associated contact details of the associated contact are presented. The contact details may be presented, for example, in a contact card or any other details element in an overlaid manner with respect to the suggestion element and while the suggestion element persists. Other arrangements are possible and may be considered within the scope of the present disclosure.

In various implementations the search query and any search may be directed towards a personal information database having information items stored therein. A mailbox is one example of a personal information database, in which case emails are examples of information items. Other information items are possible, such as calendar events, tasks, contacts, instant chat messages, text messages, and microblog posts, as well as any other type of personal information item that may be found in a searchable database.

For example, in some scenarios an event suggestion may be presented along with the search suggestions and the contact suggestions through the suggestion element in the user interface. In such a scenario, the event suggestion may be identified based at least in part on the search query. This can be accomplished by, for example, examining of at least one personal information item included in any search results associated with the search query for an indication of an event. A group of events can then be searched for at least one scheduled event that satisfies event criteria indicative of the indication of the event.

Figure 1:
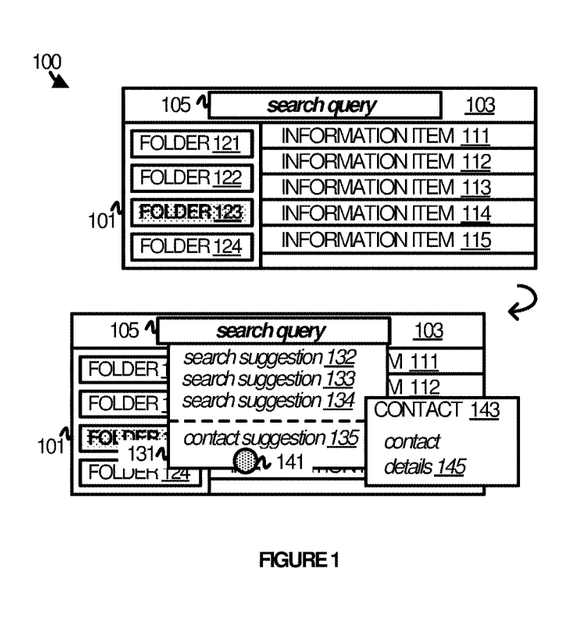
FIG. 1 illustrates a user interface to a personal information service and various operational features in an implementation.
Figure 2:
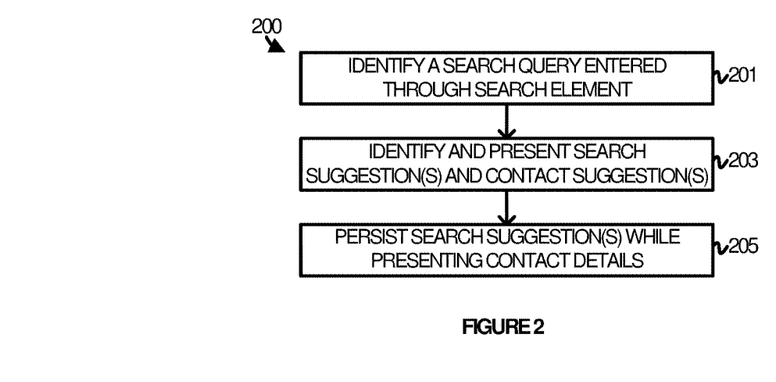
FIG. 2 illustrates an enhanced suggestion process carried out by a suitable computing platform or platforms in an implementation.
Figure 3:
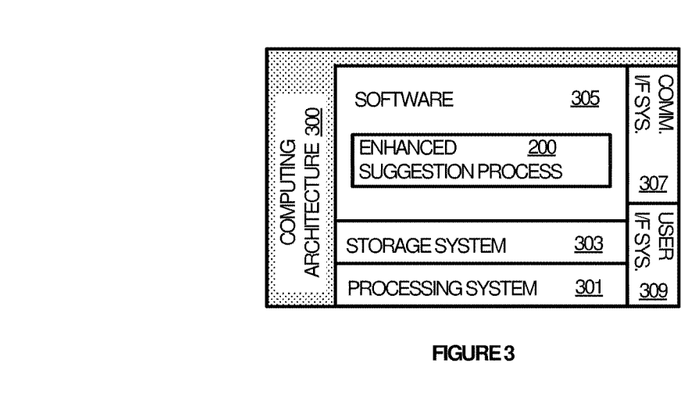
FIG. 3 illustrates a computing architecture suitable for implementing any computing platform in an implementation.
Figure 4:
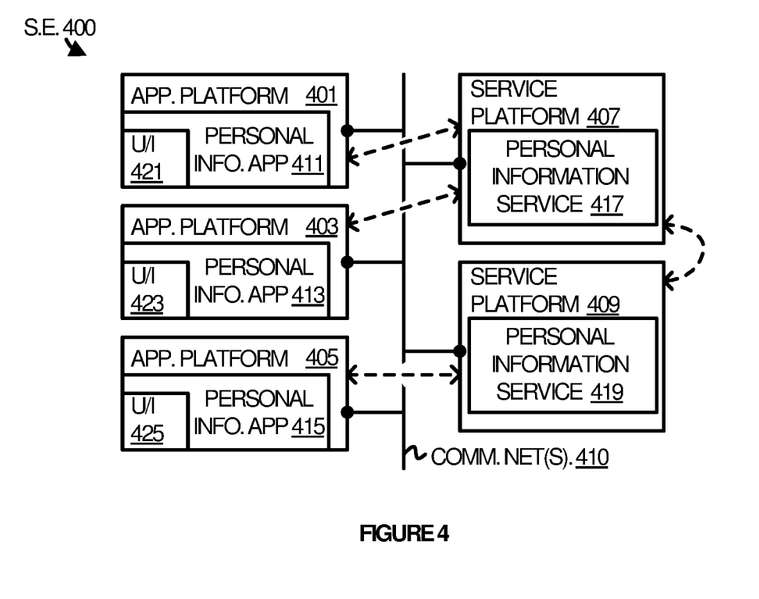
FIG. 4 illustrates a service environment in an implementation in which various computing platforms provide a personal information service.

Referring now to the drawings, FIG. 1 illustrates various features and functionality that may be experienced through a user interface 101 when an enhanced suggestion process 200, illustrated in FIG. 2, is implemented. The enhanced suggestion process 200 may be embodied in software executable by any suitable computing system or collection of systems employing a suitable computing architecture, of which computing architecture 300 in FIG. 3 is representative. The user interface 101 and its associated features and functionality may be rendered, surfaced, or otherwise presented and experienced when the software is executed. FIG. 4 illustrates a service environment 400 in which a personal information service may be provisioned and delivered, while FIGS. 5-9 illustrate the user interface 101 and various other operational features and functionality.

In particular, FIG. 1 illustrates an operational scenario 100 involving a user interface 101 to a personal information service in an implementation. User interface 101 provides an interface through which a user may interact with various aspects of a personal information service. Examples of user interface 101 include graphical user interfaces, natural user interfaces, web-based user interfaces, gesture-based user interfaces, and object-oriented user interfaces, as well as any other type of user interface, combinations or variations thereof.

User interface 101 includes an application bar 103 which may be used to present various tools, information, features, or other aspects of a personal information service. Application bar 103 includes search box 105, in which a user may enter search queries. Search queries entered via search box 105 launch searches of a personal information database associated with the user that contains personal information items. In an example, a user may initiate a search through search box 105 of their emails stored in their mailbox. In this scenario, user interface 101 includes various information items 111-115 and various folders 121-124 merely for illustrative purposes. User interface 101 may include other aspects not discussed herein for purposes of clarity.

User interface 101 may be presented when, for example, a personal information application or other software associated with the personal information service is executed, while the various features and functionality illustrated by operational scenario 100 may be experienced when enhanced suggestion process 200 is implemented in such software. Examples of software in which enhanced suggestion process 200 may be implemented include, but are not limited to, personal information applications, browser applications, client-side programs, and server-side programs, as well as any other type of software program, combination of programs, or variations thereof. The execution of any such program or collection of programs by any suitable computing system or systems drives the system or systems to operate as described herein for enhanced suggestion process 200. Accordingly, the following discussion of operational scenario 100 makes reference parenthetically to the steps included in and illustrated with respect to enhanced suggestion process 200.

In operation, a user may interact with user interface 101 to search, via search box 105, a personal information database. Other mechanisms for inputting or otherwise initiating a search query are possible and may be considered within the scope of the present disclosure. For exemplary purposes, it is assumed in operational scenario 100 that the user has entered a search query in search box 105. The search query is identified (step 201), with which the search may performed and search results returned. The search results may include various information items relevant to the search query that are retrieved from the personal information items and possibly other sources.

Either prior to or while some or all of the search results are returned, or even before the search commences, one or more search suggestions and one or more contact suggestions are identified based on the search query and presented via suggestion box 131 (step 203). In this scenario, search suggestions 132-134 are presented and contact suggestion 135 is presented.

It may be appreciated that a wide variety of well-known techniques may be employed to identify the search suggestions and may be considered within the scope of the present disclosure. For example, the search query or portions thereof may be compared against previous queries to identify search suggestions. In another example, at least some search results may be analyzed in order to arrive at the search suggestions. A wide variety of techniques may also be employed to identify the contact suggestions and may be considered within the scope of the present disclosure. For example, the search query or portions thereof may be compared against the contacts in a contact database to find at least one contact that matches the search query or otherwise satisfies contact criteria derived from the search query. In another example, search results may be analyzed for any personal information item that identifies a person, the identity of which can then be used to identify a contact suggestion.

Further in operation, a user may make an indication of interest 141 with respect to contact suggestion 135, such as by touching, click on, hovering over, audibly referencing, or otherwise selecting contact suggestion 135. In response to the indication of interest, an associated contact 143 and its contact details 145 are presented while persisting the presentation of suggestion box 131 and at least its search suggestions 132-134 (step 205). The contact details 145 may include a variety of information with which to contact the person represented by the associated contact 143, such as a phone number, email address, social media handle, or the like. In some implementations it may be possible to initiate communication from the associated contact 143, such as by selecting a phone call or messaging control displayed therein.

Persisting a search box and search suggestions enables a user to interact with a contact suggestion without losing the advantages provided by the search suggestions. For example, a search suggestion may indeed be useful to a user, but before selecting it and running the search based on the search suggestion, the user may wish to view details of a contact associated with a contact suggestion. The user is now free to view the contact details, and even possibly initiate communication with the contact, while retaining the ability to return to the search suggestions so as to enjoy their associated benefits. In the past, the selection of a suggested contact from a list of suggestions resulted in the presentation of the contact the cessation of the suggestions. In other words, the selection of a suggested contact has been treated as an indication that its associated contact should be used as the subject of a search. Here, while an associated contact can still be used as the subject of a search, it can also be viewed and interacted with while retaining the ability to select a search suggestion to use as the subject of a search. Other advantages are possible and may be considered within the scope of the present disclosure.

At any time a user may proceed with a search using the search query as initially entered. The user may also select one of the search suggestions, in response to which a search would be carried out using the search suggestion. Search results would be returned and presented in user interface 101. It may be appreciated that enhanced suggestion process 200 may also be applicable in other contexts, in addition to personal information applications and services. For example, enhanced suggestion process 200 and its associated features and functionality may be applied as well to desktop search, Internet search, and the like.

Variations of enhanced suggestion process 200 are possible and may be considered within the scope of the present disclosure. For example, other steps in addition to those described may be performed. In addition, variations on the steps described herein are possible, including initiating a particular function or feature. In an example, enhanced suggestion process 200 as discussed herein includes the steps of presenting suggestions and presenting contact details, among other steps. A variation of each could include initiating the presentation of suggestions and initiating the presentation of contact details. It may be appreciated that other variations are possible and may be considered within the scope of the present disclosure.

Referring now to FIG. 3, computing architecture 300 is representative of an architecture that may be employed in any computing apparatus or system or collections thereof to suitably implement all or portions of enhanced suggestion process 200 or variations thereof, and optionally all or portions of the personal information application referred to with respect to FIG. 1. Computing architecture 300 may be employed in, for example, desktop computers, laptop computers, tablet computers, notebook computers, mobile computing devices, cell phones, media devices, and gaming devices, as well as any other type of physical or virtual computing machine and any combination or variation thereof. Computing architecture 300 may also be employed in, for example, server computers, cloud computing platforms, data centers, any physical or virtual computing machine, and any variation or combination thereof.

Enhanced suggestion process 200 may be implemented on a single computing system or may be implemented in a distributed manner. The personal information application may also be implemented on a single computing system or may be implemented in a distributed manner Enhanced suggestion process 200 may be integrated with the personal information application, but may also stand alone or be embodied in some other application.

Computing architecture 300 includes processing system 301, storage system 303, software 305, communication interface system 307, and user interface system 309. Processing system 301 is operatively coupled with storage system 303, communication interface system 307, and user interface system 309. Processing system 301 loads and executes software 305 from storage system 303. When executed by processing system 301, software 305 directs processing system 301 or other elements of computing architecture 300 to operate as described herein for enhanced suggestion process 200 or its variations. Computing architecture 300 may optionally include additional devices, features, or functionality not discussed here for purposes of brevity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, systems on a chip, and logic devices, as well as any other type of processing device, combinations, or variations.

Storage system 303 may comprise any computer readable storage media readable by processing system 301 and capable of storing software 305. Storage system 303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations storage system 303 may also include computer readable communication media over which software 305 may be communicated internally or externally.

Storage system 303 may be implemented as a single storage device but may also be implemented across multiple storage devices or sub-systems co-located or distributed relative to each other. Storage system 303 may comprise additional elements, such as a controller, capable of communicating with processing system 301 or possibly other systems.

Software 305 may be implemented in program instructions and among other functions may, when executed by processing system 301, direct processing system 301 or other elements of computing architecture 300 to operate as described herein for enhanced suggestion process 200. For example, the program instructions may, when executed by processing system 301, direct processing system 301 to identify a search query, identify based on the search query a search suggestion and a contact suggestion, initiate presentation of at least the search suggestion and the contact suggestion, and in response to an indication of interest made with respect to the contact suggestion, initiate presentation of associated contact details while persisting the presentation of the search suggestion.

The program instructions may include various components or modules that cooperate or otherwise interact to carry out enhanced suggestion process 200. The various components or modules may be embodied in compiled instructions or interpreted instructions or in some other variation of or combination of instructions. The various components or modules may be executed in a synchronous or asynchronous manner, in a serial or in parallel, in a single threaded environment or multi-threaded, or in accordance with any other suitable programming and execution paradigm, variation, or combination thereof.

Software 305 may include additional processes, programs, or components, such as operating system software or other application software. Software 305 may also comprise firmware or some other form of machine-readable processing instructions executable by processing system 301.

In general, software 305 may, when loaded into processing system 301 and executed, transform a suitable apparatus, system, or device employing computing architecture 300 overall from a general-purpose computing system into a special-purpose computing system customized to facilitate enhanced search suggestion technology as described herein for each implementation. Indeed, encoding software 305 on storage system 303 may transform the physical structure of storage system 303. The specific transformation of the physical structure may depend on various factors in different implementations of this description. Examples of such factors may include, but are not limited to, the technology used to implement the storage media of storage system 303 and whether the computer-storage media are characterized as primary or secondary storage, as well as other factors.

For example, if the computer-storage media are implemented as semiconductor-based memory, software 305 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Referring again to FIG. 1, through the operation of a suitable computing system implementing enhanced suggestion process 200, transformations may be performed with respect to user interface 101. As an example, user interface 101 could be considered transformed from one state to another when subject to enhanced suggestion process 200 or variations thereof. In a first state, user interface 101 includes a search element with a search query entered therein and associated search suggestions and contact suggestions presented in a suggestion element. In response to an indication of interest made with respect to one of the contact suggestions, contact details for an associated contact are presented while persisting the suggestion element, thereby changing user interface 101 to a second, different state.

It should be understood that computing architecture 300 is generally intended to represent an architecture on which software 305 may be deployed and executed in order to implement enhanced suggestion process 200 (or variations thereof) and optionally all or portions of a personal information application. However, computing architecture 300 may also be suitable for any computing system on which software 305 may be staged and from where software 305 may be distributed, transported, downloaded, or otherwise provided to yet another computing system for deployment and execution, or yet additional distribution.

Communication interface system 307 may include communication connections and devices that allow for communication with other computing systems over a network or collection of networks. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 309 may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 309. In some cases, the input and output devices may be combined in a single device, such as a display capable of displaying images and receiving touch gestures. The aforementioned user input and output devices are well known in the art and need not be discussed at length here.

User interface system 309 may include associated user interface software executable by processing system 301 in support of the various user input and output devices discussed above. Separately or in conjunction with each other and other hardware and software elements, the user interface software and devices may support a graphical user interface, a natural user interface, or the like. In operation, user interface system 309 is capable of presenting a user interface to a personal information service, such as user interface 101 illustrated in FIG. 1. As such, a user may interact with a personal information service and associated applications through user interface 101 by way of user interface system 309.

FIG. 4 illustrates a service environment 400 in which various personal information applications may implement all or portions of enhanced suggestion process 200. Service environment 400 includes application platform 401, application platform 403, and application platform 405, service platform 407, service platform 409, and communication network 410. Application platform 401 and application platform 403 communicate with service platform 407 to access personal information service 417 on behalf of personal information application 411 and personal information application 413 respectively. Application platform 405 communicates with service platform 409 to access personal information service 419 on behalf of personal information application 415. From time to time, service platform 407 and service platform 409 may communicate to enable interaction between personal information service 417 and personal information service 419, and by extension, interaction by application platforms 401 and 403 with application platform 405.

Examples of application platforms 401, 403, and 405, include, but are not limited to, desktop computers, work stations, laptop computers, notebook computers, tablet computers, mobile phones, personal digital assistances, media devices, gaming devices, routers, and any other physical or virtual computing machine, or combinations and variations thereof, capable of implementing at least one of a variety of personal information applications. Service platform 407 may be any computing system or collection of computing systems capable of implementing a personal information service 417, while service platform 407 may be any computing system or collection of computing systems capable of implementing a personal information service 419.

Application platforms 401, 403, and 405 may each be any computing apparatus, system, device, or collections thereof that employ a computing architecture suitable for implementing personal information applications 411, 413, and 415 respectively, the execution of which results in the rendering or presentation of user interfaces 421, 423, and 425 respectively. Computing architecture 300 referred to with respect to FIG. 3 is one such representative architecture. Personal information applications 411, 413, and 415 may each be any version or variety of personal information application. Examples include but are not limited to locally installed and executed applications, streamed applications, web-based applications that execute at least in part within the context of a browser application, mobile applications, mobile web-based applications that execute at least in part within the context of a mobile browser application, or any other application type, variation, or combination thereof.

User interfaces 421, 423, and 425 may each be any type of software interface that enables a user to interact with a personal information service. The execution of personal information applications 411, 413, and 425 by application platforms 401, 403, and 405 results in the presentation of user interfaces 421, 423, and 425 by way of their respective user interface systems, of which user interface system 309 is representative. Examples of user interfaces 421, 423, and 425 include graphical user interfaces, natural user interfaces, web-based user interfaces, gesture-based user interfaces, and object-oriented user interfaces, as well as any other type of user interface, combinations or variations thereof. User interface 101 or variations thereof is representative of user interfaces 421, 423, and 425.

Personal information applications 411, 413, and 415 may each be embodied in program instructions that, when executed by application platforms 401, 403, and 405 respectively direct each to operate as described herein for enhanced suggestion process 200 discussed with respect to FIG. 2. The program instructions may take the form of compiled object code, interpreted scripts, or any other suitable form of program instructions that may be executed directly or indirectly by an application platform, as well as any suitable variation or combination thereof. Examples of personal information applications include but are not limited to Microsoft® Outlook®, Mozilla Thunderbird/Lightening, Open Xchange, Microsoft® Outlook® Web App, Microsoft® Outlook® Web App for mobile devices, Outlook.com®, Gmail, and Microsoft® Outlook® for mobile devices, as well as another suitable personal information application, variation, or combination thereof.

Service platform 407 and service platform 409 may each include any computing apparatus, system, device, or collections thereof that employ a computing architecture suitable for implementing personal information service 417 and personal information service 419 respectively. Computing architecture 300 referred to with respect to FIG. 3 is one such representative architecture. Examples include server computers, cloud computing platforms, data centers, and any physical or virtual computing machine, as well as any variation or combination thereof. Examples of personal information service 417 and personal information service 419 include, but are not limited to, Microsoft® Exchange®, Microsoft® O365®, Hotmail®, Outlook.com®, and Gmail, as well as any other information exchange service, combination, or variation thereof capable of operating as described herein.

In operation, any of applications platforms 401, 403, and 405 may communicate from time to time with service platform 407 or service platform 409 over communication network 410 to facilitate the exchange of information between personal information applications 411 and 413 and personal information service 417, and between personal information application 415 and personal information service 419. Service platform 407 and service platform 409 may also communicate over communication network 410 to facilitate the exchange of information. For example, information may be exchanged to facilitate the sending and receiving of email, the creation and monitoring of calendar events, the creation and monitoring of tasks, and to facilitate the searching of email, events, and tasks, as well as for other reasons. Such communication is generally well known in the art and need not be discussed at length here.

Communication between any of the elements contemplated in FIG. 4 may occur in accordance with various communication protocols, such as the Internet protocol (IP, IPv4, IPv6, etc.), the transfer control protocol (TCP), and the user datagram protocol (UDP), as well as any other suitable communication protocol, variation, or combination thereof.

Communication network 410 may be representative of a network or collection of networks over which the elements contemplated in FIG. 4 may exchange information, such as an intranet, the Internet, a local area network, a wide area network, a wireless network, a wired network, or any combination or variation thereof. Communication network 410 may include connections, devices, and communication media, such as metal, glass, air, or any other suitable communication media over which information may be exchanged. The aforementioned communication media, network, connections, protocols, and devices are well known and need not be discussed at length here.

The manner and format in which information is exchanged may vary. In some implementations, a personal information application may exchange information with a personal information service in accordance with various protocols, such as IMAP (internet message access protocol), POP (post office protocol), SMTP (simple mail transfer protocol), OWA (Outlook Web App) webmail protocol, various other webmail protocols, various proprietary protocols, HTTP (hypertext transfer protocol), REST (representational state transfer), Web Socket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

In operation, a client device (application platforms 401, 403, 405) running a personal information application receives a search query. The search query may be a string of characters input entered by a user through a user interface (user interfaces 421, 423, and 425) that is rendered when the personal information application is executed. T To assist the user, the personal information application presents several suggestions relating to the search query. The suggestions may be, for example, word completions, phrase completions, or some other type of search suggestion. The suggestions may also include personal information items, such as suggested events, tasks, or contact. A user is able to optionally select one of the completed words or phrases or suggested items and thereby speed up or otherwise improve their search experience.

Depending upon what is selected from the suggestions, a search may commence. For example, upon selecting a word completion or a phrase completion, a search may commence based on that word or phrase. In another example, upon selecting a task or event, a search may commence based on the word or event. In either case, the personal information application communicates the enhanced search query to a service platform (407, 409) for handling within the context of a personal information service (417, 419). Search results are returned to the personal information application and presented accordingly.

However, in some cases it may be a suggested contact that is selected. Rather than initiating defining the search query based on the suggested contact, an associated contact and its contact details are surfaced and presented to the user while persisting the display of the other suggestions. The user may thus interact with the contact and its details and, if so desired, return to the other suggestions without having to replicate the initial search query.

In fact, such an arrangement is also possible with respect to the other types of personal information items. For example, a suggested event may be presented in a suggestion box. Upon selection of the suggested event by a user, an associated event and its event details are presented while maintaining the presentation of other suggestions. The user can then interact with the associated event, its details, and any other associated controls or features. For example, the user may decline an event or change its date or time from within the presentation of it that is surfaced while maintaining the other suggestions.

In some scenarios, the contacts or other personal information items that may be included in a list of query suggestions are identified by matching the characters in a search query to various known contacts and other items. However, in some scenarios the contacts or other items may be discovered even though they would not satisfy such searching criteria. Rather the contacts or other items may be discovered by analyzing at least some search results for people, meetings, trips, or other indicators that appear important or relevant. Associated contacts, events, or other items may then be derived from the relevant indicators and presented along with the other search suggestions in a suggestion list for a query.

FIGS. 5-9 illustrate various operational scenarios involving a user interface to a personal information service. The various features and functionality illustrated with respect to the operational scenarios may be experienced when an enhanced suggestion process is carried out by a suitable computing system running a personal information application. User interface 101 is representative of user interfaces 421, 423, and 425 illustrated in FIG. 4. Examples of user interface 101 include graphical user interfaces, natural user interfaces, web-based user interfaces, gesture-based user interfaces, and object-oriented user interfaces, as well as any other type of user interface, combinations or variations thereof.

Figure 5:
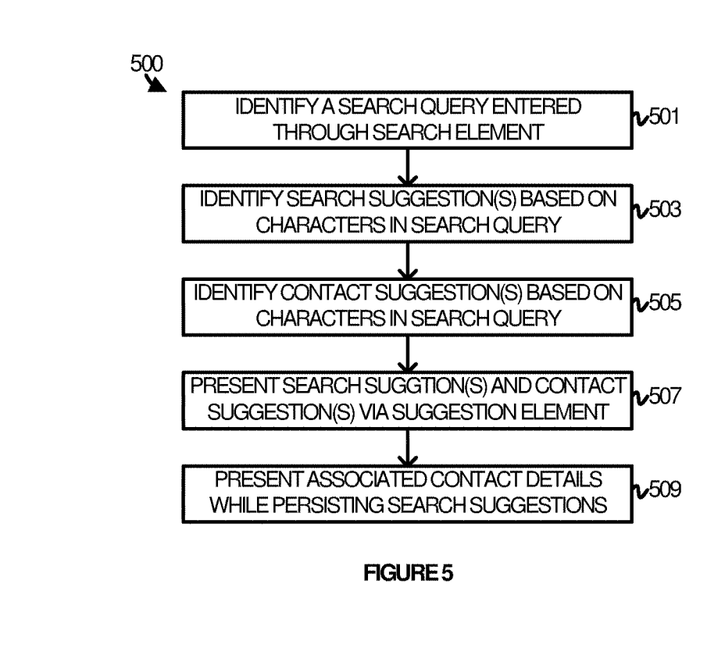
FIG. 5 illustrates an enhanced suggestion process carried out by a suitable computing platform or platforms in an implementation.
Figure 6:
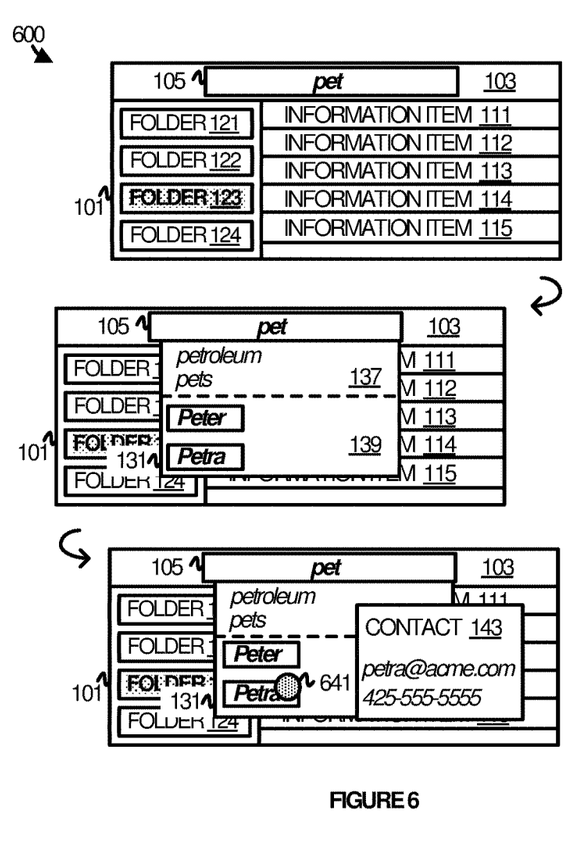
FIG. 6 illustrates a user interface to a personal information service and various operational features in an implementation.

Referring to FIG. 5 and FIG. 6, enhanced suggestion process 500 is illustrated, as well as operational scenario 600. Operational scenario 600 is representative of various features and functionality that mat be experienced with respect to user interface 101 when enhanced suggestion process 500 is carried out.

To begin, a search query "pet" is entered in search box 105 and is identified at least partly for purposes of providing automatic suggestions (step 501). Accordingly, search suggestions 137 are identified base on the characters p-e-t (step 503). In this example, the search suggestions 137 include "petroleum" and "pets." Note how the search suggestions, for exemplary purposes, each begin with the characters in the search query, although other ways in which to identify or otherwise determine search suggestions are possible.

Suggested items 139, such as suggested contacts or events, are also identified based on the characters in the search query (step 505). In this example, the suggested items 139 include a contact suggestion for Peter and a contact suggestion for Petra. Note how the contact suggestions, for exemplary purposes, each begin with the characters in the search query, although other ways in which to identify or otherwise determine contact suggestions are possible.

The search suggestions 137 and the suggested items 139 are presented in a suggestion box 131 that drops down from the search box (step 507). The user may then select any one of the selection, in response to which an enhanced query may be formed or an associated contact and its details displayed. In this example, an indication of interest 641 is made with respect to the suggested contact for Petra. In response, associated contact 143 is presented while maintaining the presentation of suggestion box 131.

Figure 7:
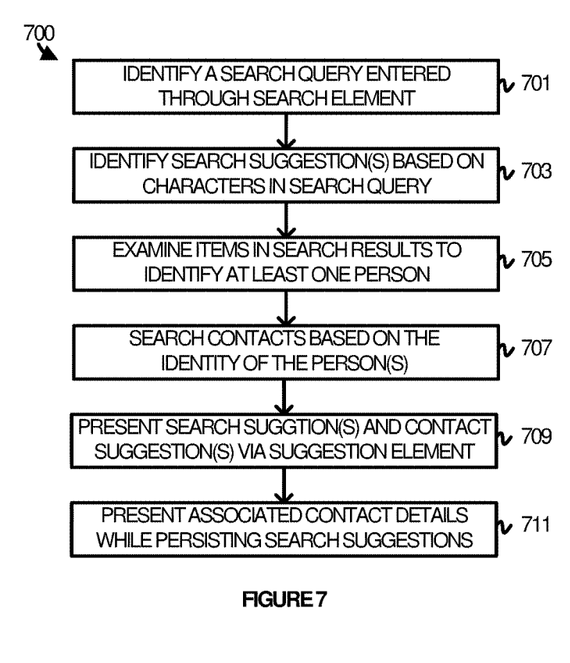
FIG. 7 illustrates an enhanced suggestion process carried out by a suitable computing platform or platforms in an implementation.
Figure 8:
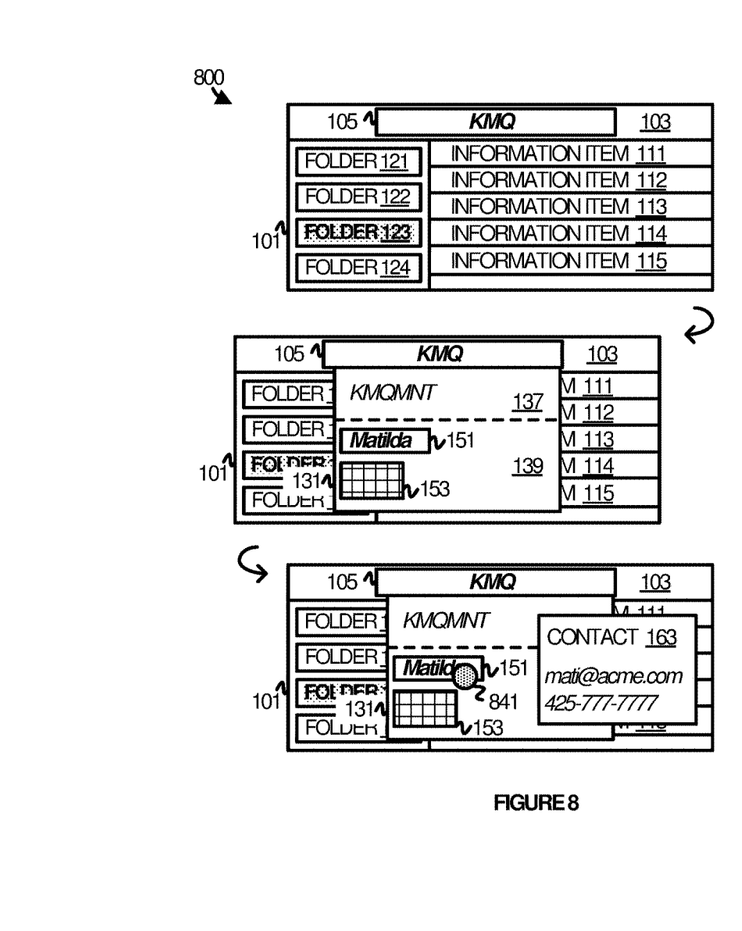
FIG. 8 illustrates a user interface to a personal information service and various operational features in an implementation.

Referring to FIG. 7 and FIG. 8, enhanced suggestion process 700 is illustrated, as well as operational scenario 800. Operational scenario 800 is representative of various features and functionality that mat be experienced with respect to user interface 101 when enhanced suggestion process 700 is carried out.

To begin, a search query "KMQ" is entered in search box 105 and is identified at least partly for purposes of providing automatic suggestions (step 701). Accordingly, search suggestions 137 are identified based on the characters K-M-Q (step 703). In this example, the search suggestions 137 include "KMQMNT," which may refer to, for example, an airline reservation. Note how the search suggestion, for exemplary purposes, begins with the characters in the search query, although other ways in which to identify or otherwise determine search suggestions are possible.

Next, an examination of at least some search results is initiated to identify a person, meeting, reservation, or some other relevant or important item (step 703). The search results may be initial results that are returned based on the initial search query. In some implementations the initial results are presented to a user, but in some scenarios the initial results might not be presented, but rather are just analyzed for purposes of identifying contact suggestions. The initial search results may include, for example, various emails, scheduled events, or tasks that were selected for having the string "KMQ" contained therein.

The items in the search results can then be analyzed for the identity of people, the occurrence of a meeting or some other event, or any other indication that can be used to identify additional suggestions (step 705). For instance, an email in the results may reference a meeting with "Matilda" in the content or body of the email. In this example, it may be assumed for exemplary purposes that Matilda is not a contact addressed by the email, such as the sender or a recipient. Contacts can then be searched for any matching "Matilda" and included in the suggested items 139 presented via suggestion box 131 (step 707). Thus, suggestion box 131 includes a suggested contact 151 for Matilda. Note how the contact suggestion, for exemplary purposes, does not begin with the characters in the search query, thus illustrating that the suggested contact is not identified directly from the characters in the search query.

In addition to contacts, other types of items may be discovered and suggested in this manner. In another example, an email in the initial search results may reference an airline reservation that indicates a travel date. Using the travel date as event criteria, events can be searched for any that might be relevant to the travel date or other suitable event criteria. A suggested event 153 can then be presented in the suggestion box 131 along with the suggested contact 151.

The search suggestions 137 and the suggested items 139 are presented in a suggestion box 131 that drops down from the search box or other such element (step 709). The user may select any one of the suggestions, in response to which an enhanced query may be formed or an associated item and its details displayed. In this example, an indication of interest 841 is made with respect to the suggested contact for Matilda. In response, contact 163 is presented while maintaining the presentation of suggestion box 131 (step 711).

Figure 9:
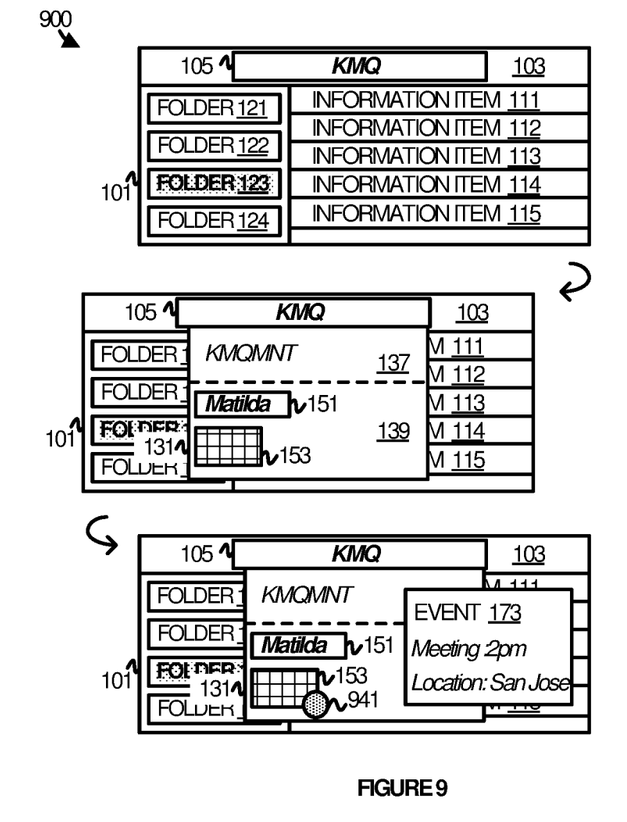
FIG. 9 illustrates a user interface to a personal information service and various operational features in an implementation.

FIG. 9 illustrates operational scenario 900, which offers a slight variation on operational scenario 800. In FIG. 9, an indication of interest 941 is made with respect to suggested event 153, rather than suggested contact 151. Accordingly, event 173 is presented, along with its event details, while persisting with the presentation of suggestion box 131.

While operational scenario generally relates to an example whereby the suggested contacts and suggested events are discovered by analyzing the content of search results, it may be appreciated suggested events may be identified based directly on the search query, much like how the suggestions were identified with respect to FIG. 6. Indeed, it may be appreciated that a variety of suggested items may be identified for suggestion in addition to or in place of those discussed herein with respect to each Figure. For example, in FIG. 6, a suggested event may have been identified and presented in suggestion box 131, the selection of which would trigger the presentation of its associated event and details. A user could then interact with the event to edit its detail, accept or decline the event, and so on.

It may be appreciated that enhanced suggestion process 200 may also be applicable in other contexts, in addition to personal information applications and services. For example, enhanced suggestion processes 500 and 700 and their associated features and functionality may be applied as well to desktop search, Internet search, and the like.

The functional block diagrams, operational sequences, and other diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having computer-readable instructions for facilitating searches of personal information items that, when executed by a processing system, direct the processing system to at least:
   receive a search query for searching a first application, wherein the first application is an electronic message application, and wherein the search query is entered through a search element in a user interface;
   identify, in the body of a message identified based on the search query of the first application, at least a search suggestion associated with a name that is not included in the search query;
   search a second application for the name;
   identify, from the search of the second application, a contact corresponding to the name;
   initiate presentation of at least the search suggestion and a contact suggestion through a suggestion element in the user interface, wherein the contact suggestion comprises the contact identified from the search of the second application; and in response to an indication of interest made with respect to the contact suggestion, initiating presentation of associated contact details while persisting the presentation of at least the search suggestion through the suggestion element in the user interface.

2. The one or more computer readable storage media of claim 1 wherein to identify the contact suggestion, the personal information application directs the processing system to at least:
initiate examination of at least one personal information item included in search results associated with the search query for an identity of at least one person;
initiate a search of a plurality of contacts for at least one contact that satisfies contact criteria comprising the identity of the one person, wherein the contact suggestion is associated with the one contact.

3. The one or more computer readable storage media of claim 1 wherein the personal information application further directs the processing system to at least identify, based at least in part on the search query, an event suggestion and initiate presentation of the event suggestion along with at least the search suggestion and the contact suggestion through the suggestion element in the user interface.

4. The one or more computer readable storage media of claim 3 wherein to identify the event suggestion based at least in part on the search query, the personal information application directs the processing system to at least:
initiate examination of at least one personal information item included in search results associated with the search query for an indication of an event;
initiate a search of a plurality of events for at least one scheduled event that satisfies event criteria comprising the indication of the event, wherein the event suggestion comprises the one scheduled event.

5. The one or more computer readable storage media of claim 1 wherein the search element comprises a search box and wherein the suggestion element comprises a suggestion box rendered in association with the search box.

6. The one or more computer readable storage media of claim 1 wherein the plurality of personal information items comprises a plurality of emails.

7. The one or more computer readable storage media of claim 1, wherein the name is identified in a body of an email.

8. A method for facilitating the searching of personal information items comprising:
receiving a search query for searching a first application, wherein the first application is an electronic message application, and wherein the search query is entered through a search element in a user interface to a personal information service;
identifying, in the body of a message identified based on the search query of the first application, a search suggestion associated with a name that is not included in the search query;
search a second application for the name;
identify, from the search of the second application, a contact corresponding to the name;
presenting at least the search suggestion and a contact suggestion through a suggestion element in the user interface, wherein the contact suggestion comprises the contact identified from the search of the second application; and
in response to an indication of interest made with respect to the contact suggestion, presenting associated contact details while persisting the presentation of at least the search suggestion through the suggestion element in the user interface.

9. The method of claim 8 identifying the contact suggestion based at least in part on the search query comprises:
examining at least one personal information item included in search results associated with the search query for an identity of at least one person; and
searching a plurality of contacts for at least one contact that satisfies contact criteria comprising the identity of at least the one person, wherein the contact suggestion comprises at least the one contact.

10. The method of claim 8 further comprising identifying, based at least in part on the search query, an event suggestion and presenting the event suggestion along with at least the search suggestion and the contact suggestion through the suggestion element in the user interface.

11. The method of claim 10 wherein identifying the event suggestion based at least in part on the search query comprises:
examining at least one personal information item included in search results associated with the search query for an indication of an event;
searching a plurality of events for at least one scheduled event that satisfies event criteria comprising the indication of the event, wherein the event suggestion comprises at least the one scheduled event.

12. The method of claim 8 wherein the search element comprises a search box and wherein the suggestion element comprises a suggestion box and wherein the plurality of information items comprises a plurality of emails.

13. The method of claim 8, wherein the name is identified in a body of an email.

14. A computing apparatus comprising:
one or more computer readable storage media; and
program instructions stored on the one or more computer readable storage media and comprising:
a search element in a user interface to a personal information service through which to enter a search query for searching a first application for a plurality of personal information items, wherein the first application is an electronic message application;
a suggestion element in the user interface through which to present at least a search suggestion identified from a body of a message based on the search query, wherein the search suggestion is associated with a name that is not included in the search query;
a contact in the user interface, identified based on a search of a second application for the name, through which to, in response to the indication of interest made with respect to the contact in the user interface, present associated contact details while at least the search suggestion persists in the suggestion element.

15. The computing apparatus of claim 14 wherein the program instructions, when executed by a processing system, direct the processing system to at least:
identify, based at least in part on the search query, the search suggestion for searching the plurality of personal information items;
identify the contact; and
initiate presentation of at least the search suggestion and the contact through a suggestion element in the user interface.

16. The computing apparatus of claim 15 wherein to identify the contact, the program instructions direct the processing system to:
initiate examination of at least one personal information item included in search results associated with the search query for an identity of at least one person; and initiate a search of a plurality of contacts for at least one contact that satisfies contact criteria comprising the identity of at least the one person, wherein the contact comprises at least the one contact.

17. The computing apparatus of claim 15 wherein the program instructions further direct the processing system to at least identify, based at least in part on the search query, an event suggestion and initiate presentation of the event suggestion along with at least the search suggestion and the contact suggestion through the suggestion element in the user interface.

18. The computing apparatus of claim 17 wherein to identify the event suggestion based at least in part on the search query, the program instructions direct the processing system to at least initiate examination of at least one personal information item included in search results associated with the search query for an indication of an event and initiate a search of a plurality of events for at least one scheduled event that satisfies event criteria comprising the indication of the event, wherein the event suggestion comprises at least the one scheduled event.

19. The computing apparatus of claim 15 further comprising the processing system configured to execute the program instructions, wherein the search element comprises a search box, wherein the suggestion element comprises a suggestion box, and wherein the plurality of information items comprises a plurality of emails.

20. The computing apparatus of claim 14, wherein the name is identified in a body of an email.

* * * * *